United States Patent [19]
Billett et al.

[11] 3,807,553
[45] Apr. 30, 1974

[54] SHEET MATERIAL STACKING APPARATUS

[75] Inventors: Ronald J. Billett, Sunnyvale; Gary O. Niemann, Mountain View, both of Calif.

[73] Assignee: FMC Corporation, San Jose, Calif.

[22] Filed: Mar. 13, 1972

[21] Appl. No.: 234,119

[52] U.S. Cl. .................. 209/74 R, 209/75, 209/125, 214/6 DK, 271/64, 271/174, 271/190, 271/217
[51] Int. Cl. ......................... B07c 3/14, B65h 29/34
[58] Field of Search ............. 271/75, 68, 77, 78, 73, 271/86, 88, 76, 45, 64; 214/6 DK; 209/74, 75, 125

[56] References Cited
UNITED STATES PATENTS

| | | | |
|---|---|---|---|
| 3,545,744 | 12/1970 | Herman | 271/68 X |
| 2,492,024 | 12/1949 | McWilliams | 271/68 |
| 2,859,965 | 11/1958 | Pabst et al. | 271/68 |
| 2,787,214 | 4/1957 | Halahan et al. | 271/45 X |
| 1,948,142 | 2/1934 | Swift | 271/45 |
| 3,598,252 | 8/1971 | Billett et al. | 214/6 DK |
| 3,477,712 | 11/1969 | Stotzer et al. | 214/6 H |
| 2,478,610 | 8/1949 | Uschmann et al. | 271/64 X |
| 2,839,295 | 6/1958 | Bernard | 271/86 |
| 2,984,178 | 5/1961 | Koch | 271/79 |
| 3,489,407 | 1/1970 | Ackermann | 271/45 |

FOREIGN PATENTS OR APPLICATIONS 1,140,871 12/1962 Germany .............................. 271/68

*Primary Examiner*—Evon C. Blunk
*Assistant Examiner*—Bruce H. Stoner, Jr.
*Attorney, Agent, or Firm*—R. S. Kelly; J. W. Edwards; C. E. Tripp

[57] ABSTRACT

A horizontal conveyor transports sheets of material in a given direction along a line of travel. At stations along said line the sheets can be selectively diverted downward through the conveyor to vertical stacks thereunder. Automatic controls are provided for sorting the sheets of material according to size, stacking the assorted sheets, and discharging the stacks when full.

22 Claims, 16 Drawing Figures

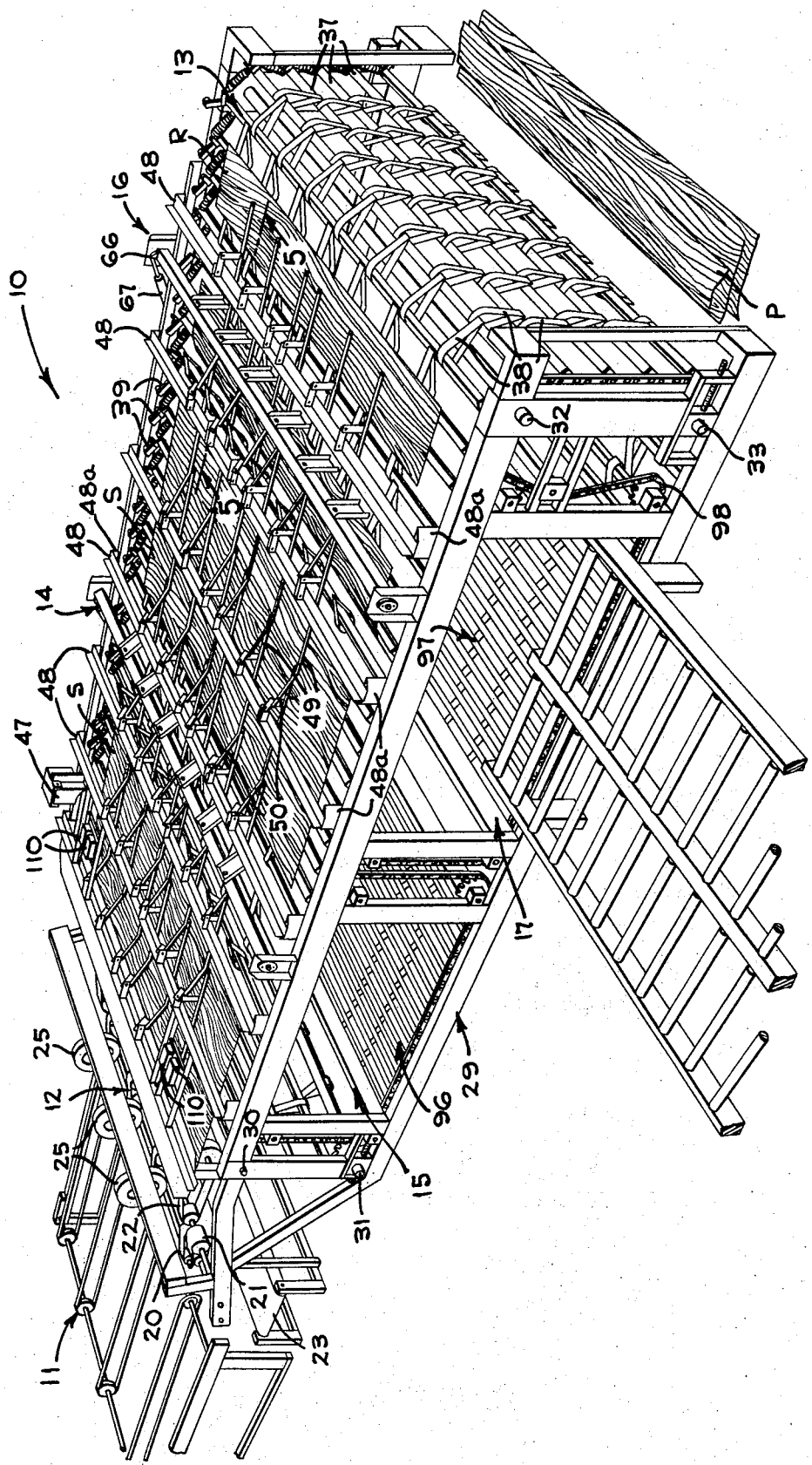

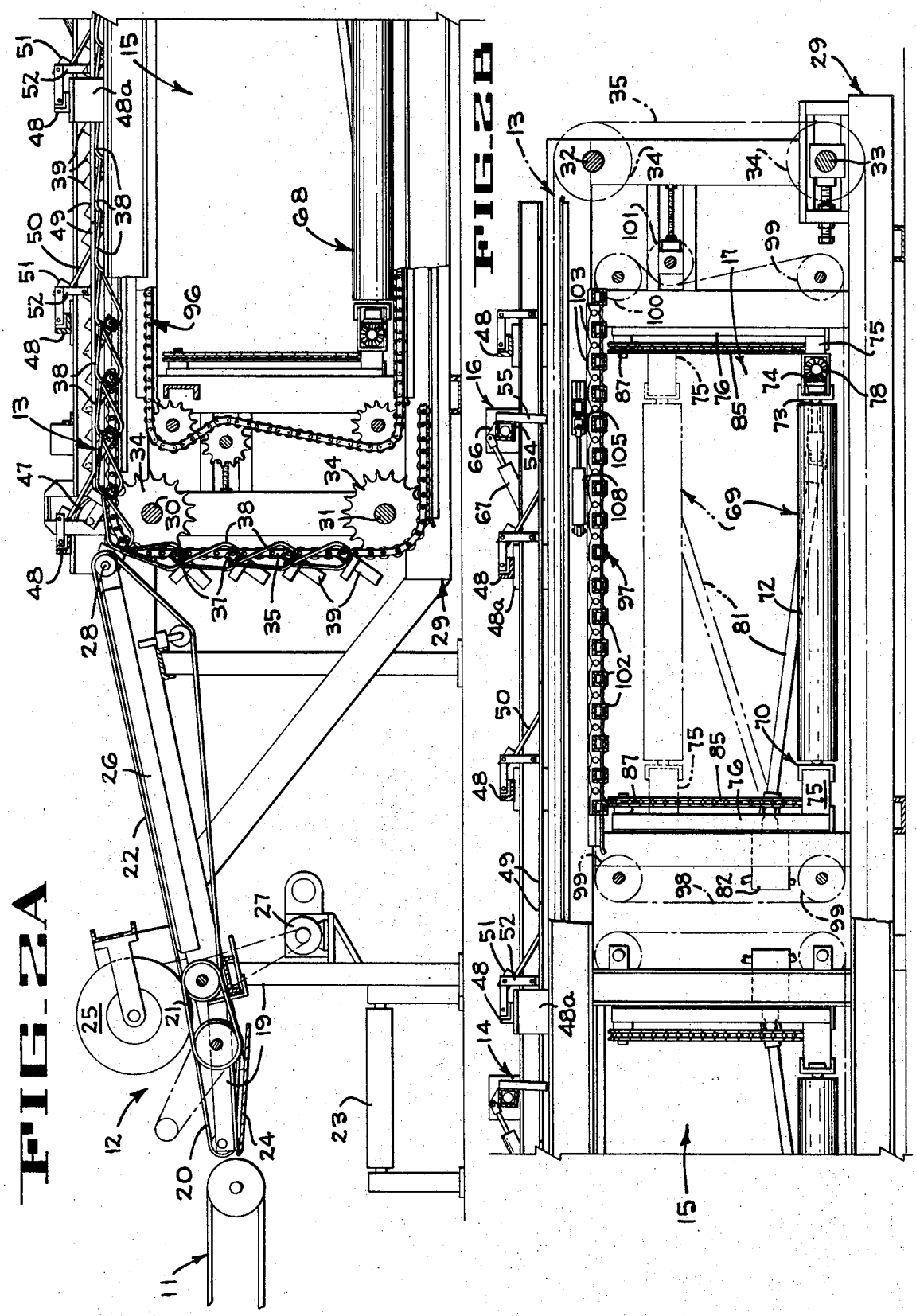

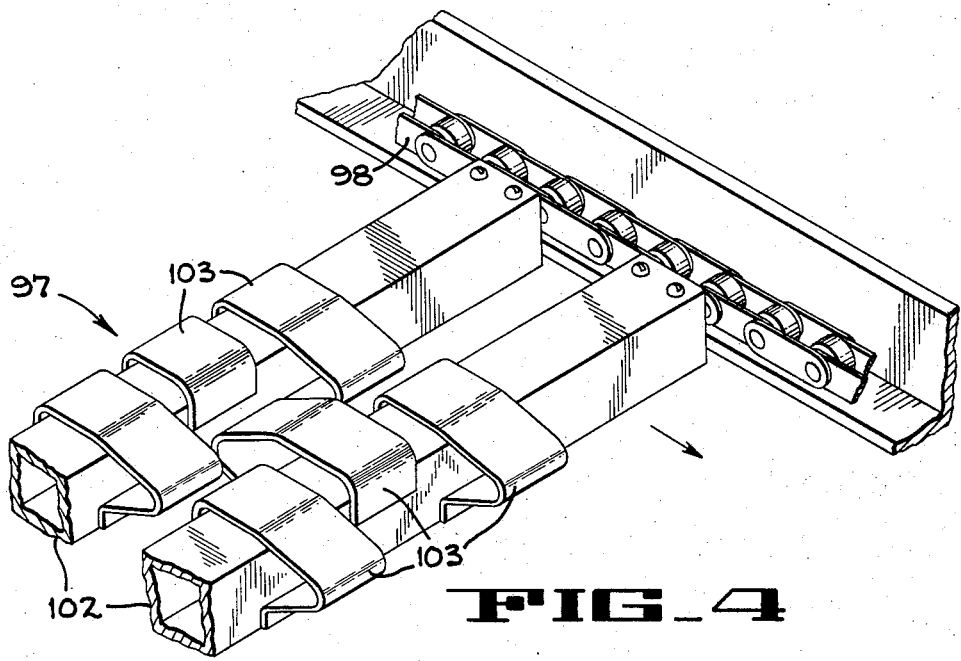
FIG_4
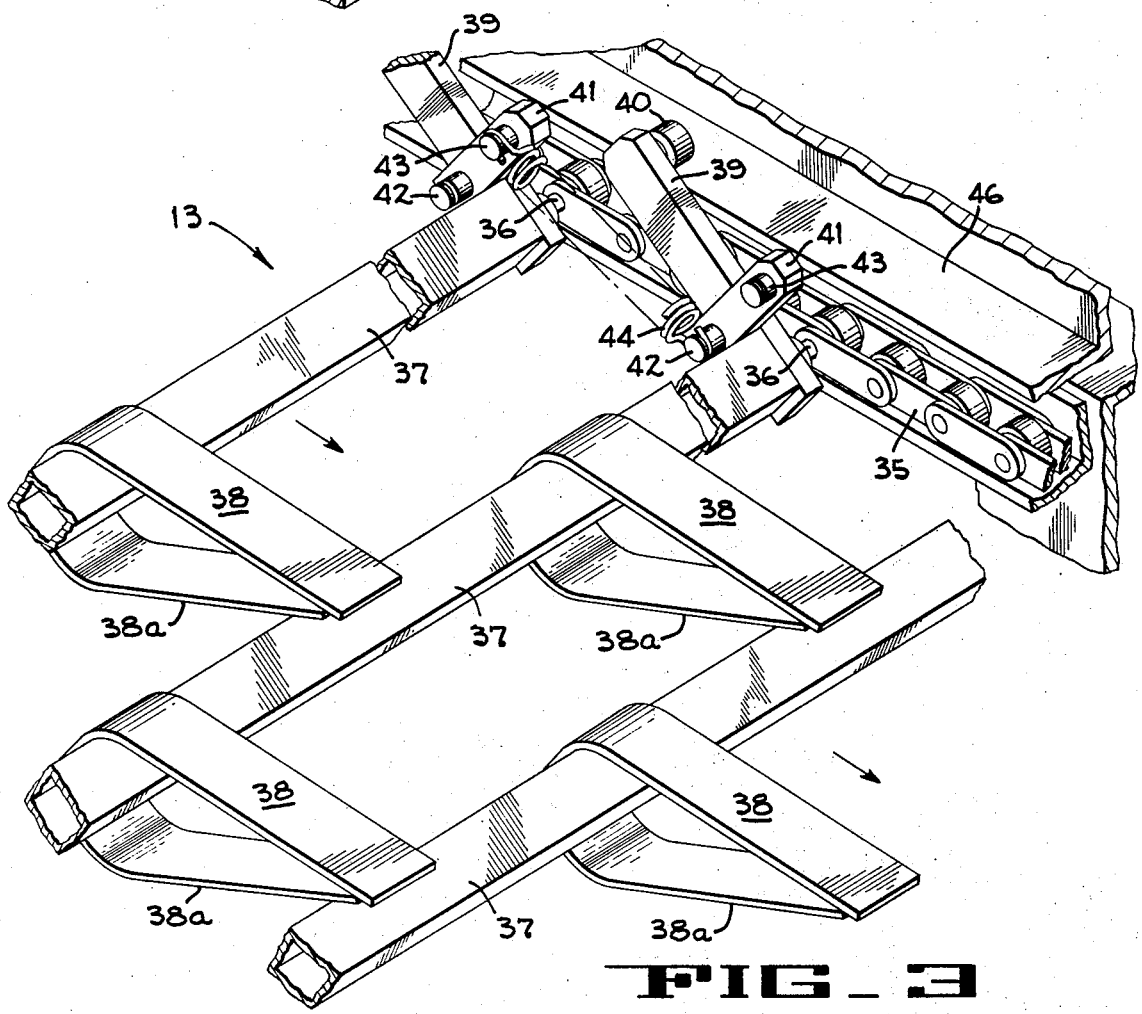
FIG_3

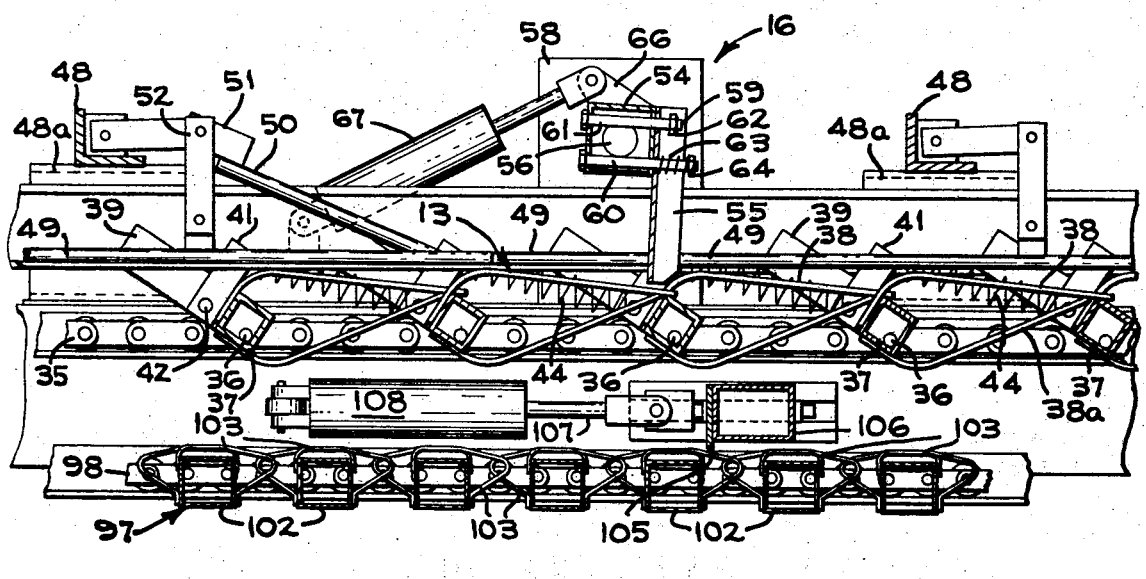
FIG_5
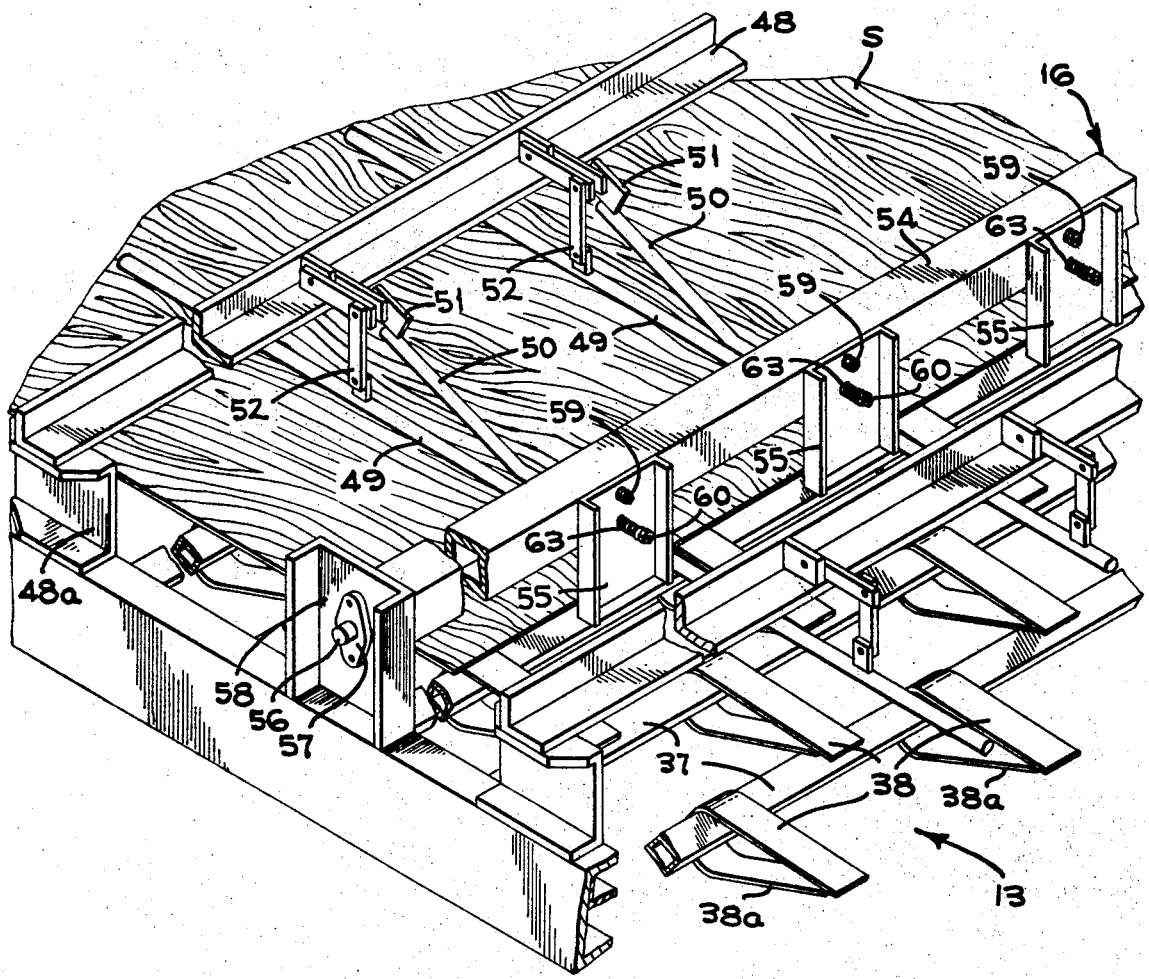
FIG_6

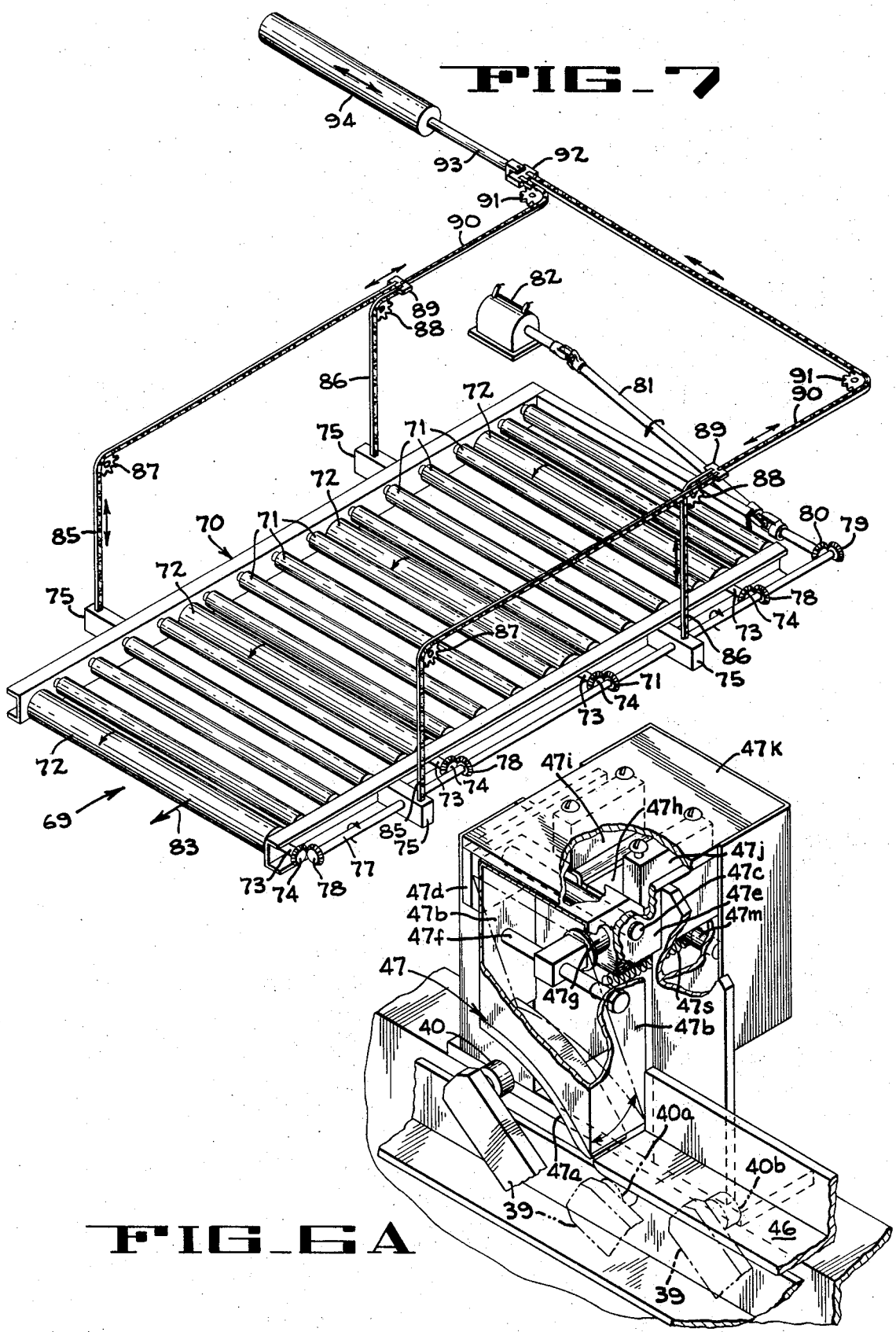

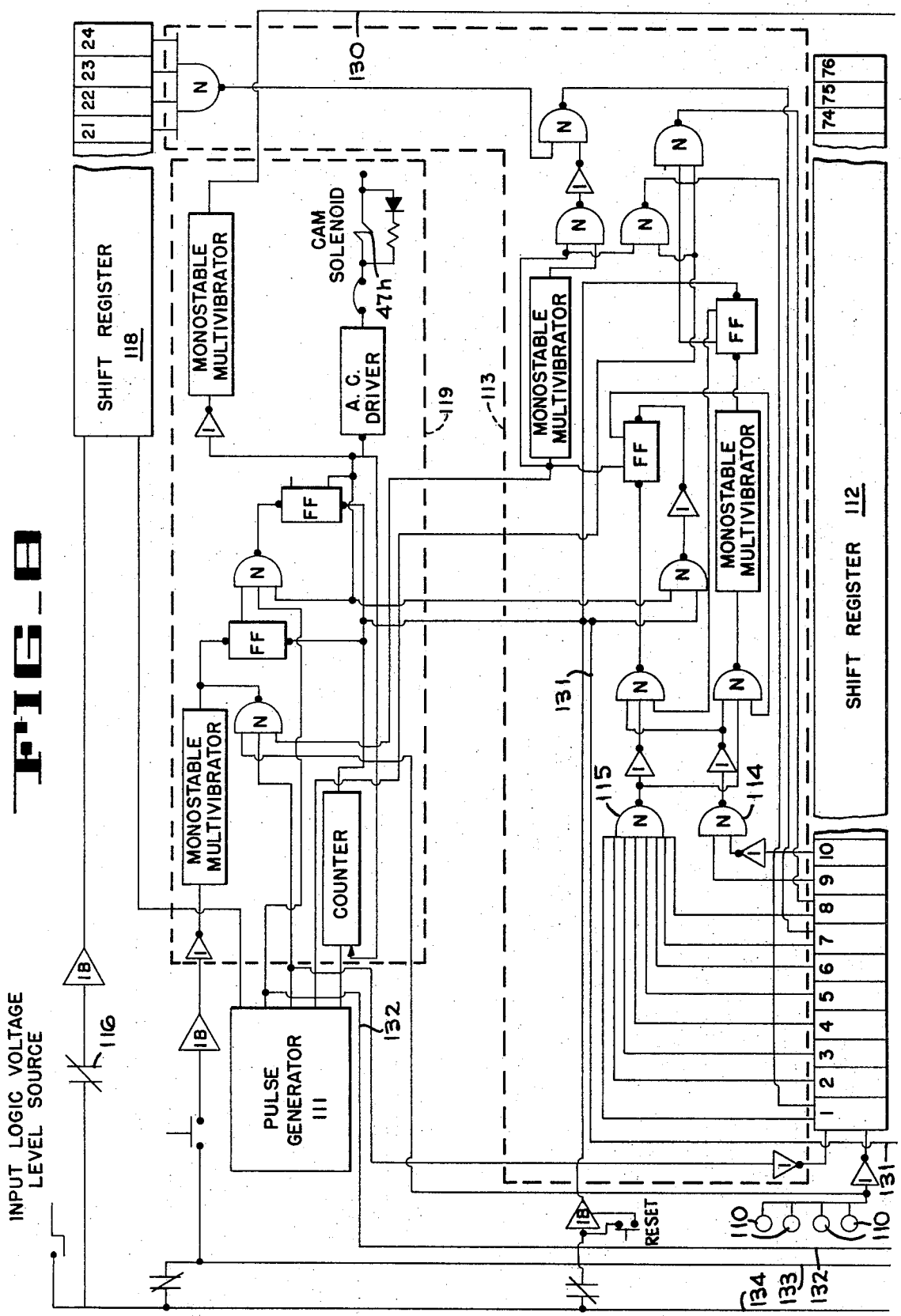

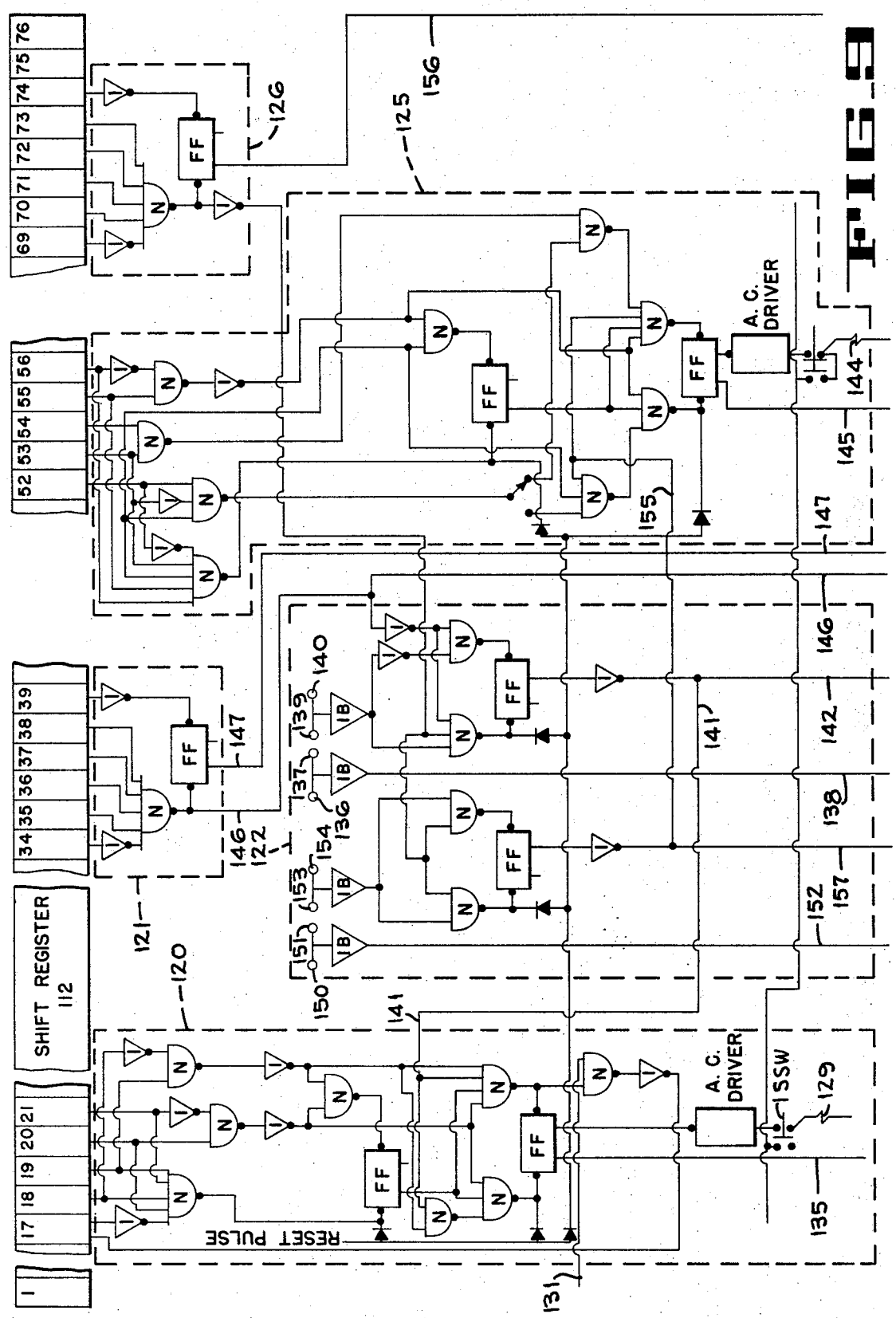

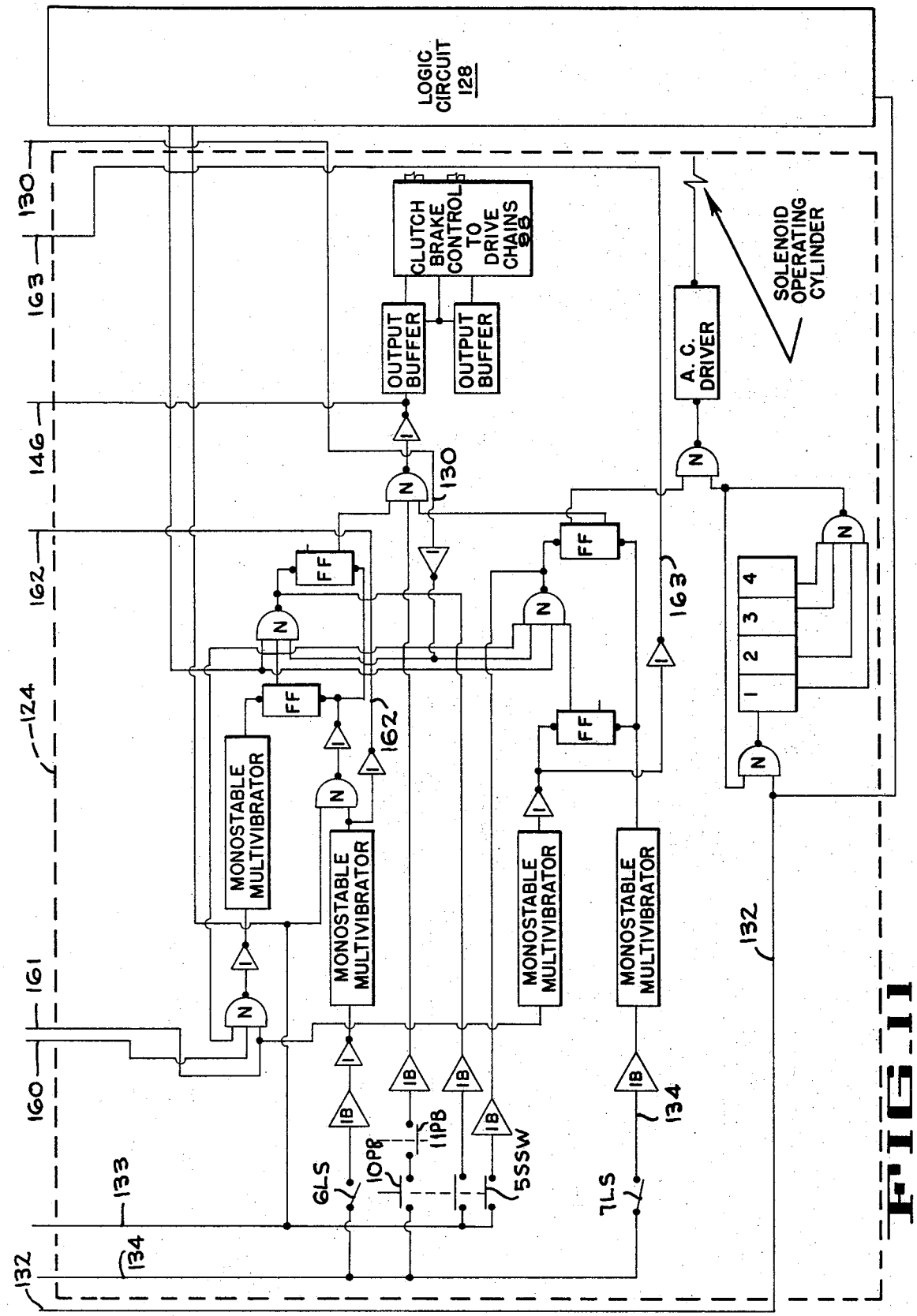

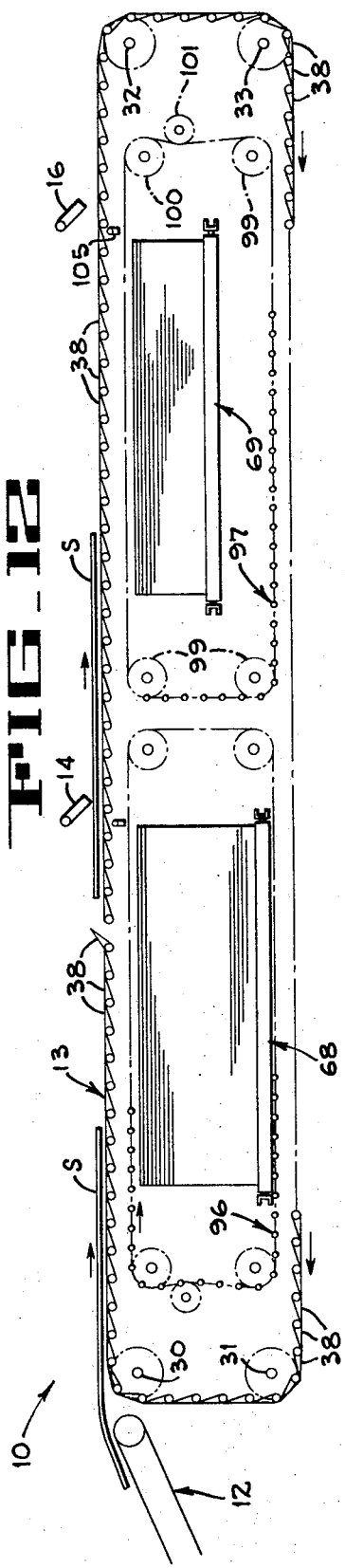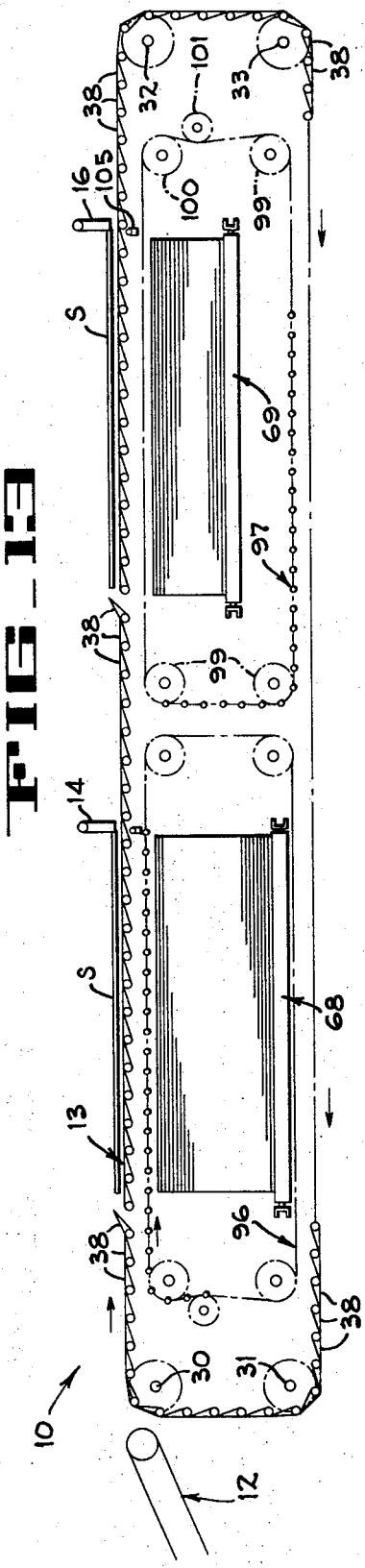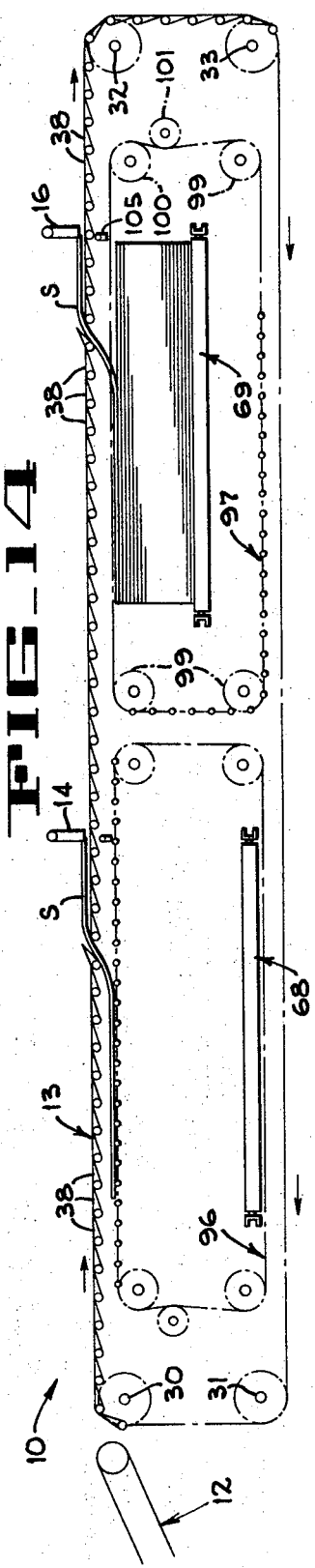

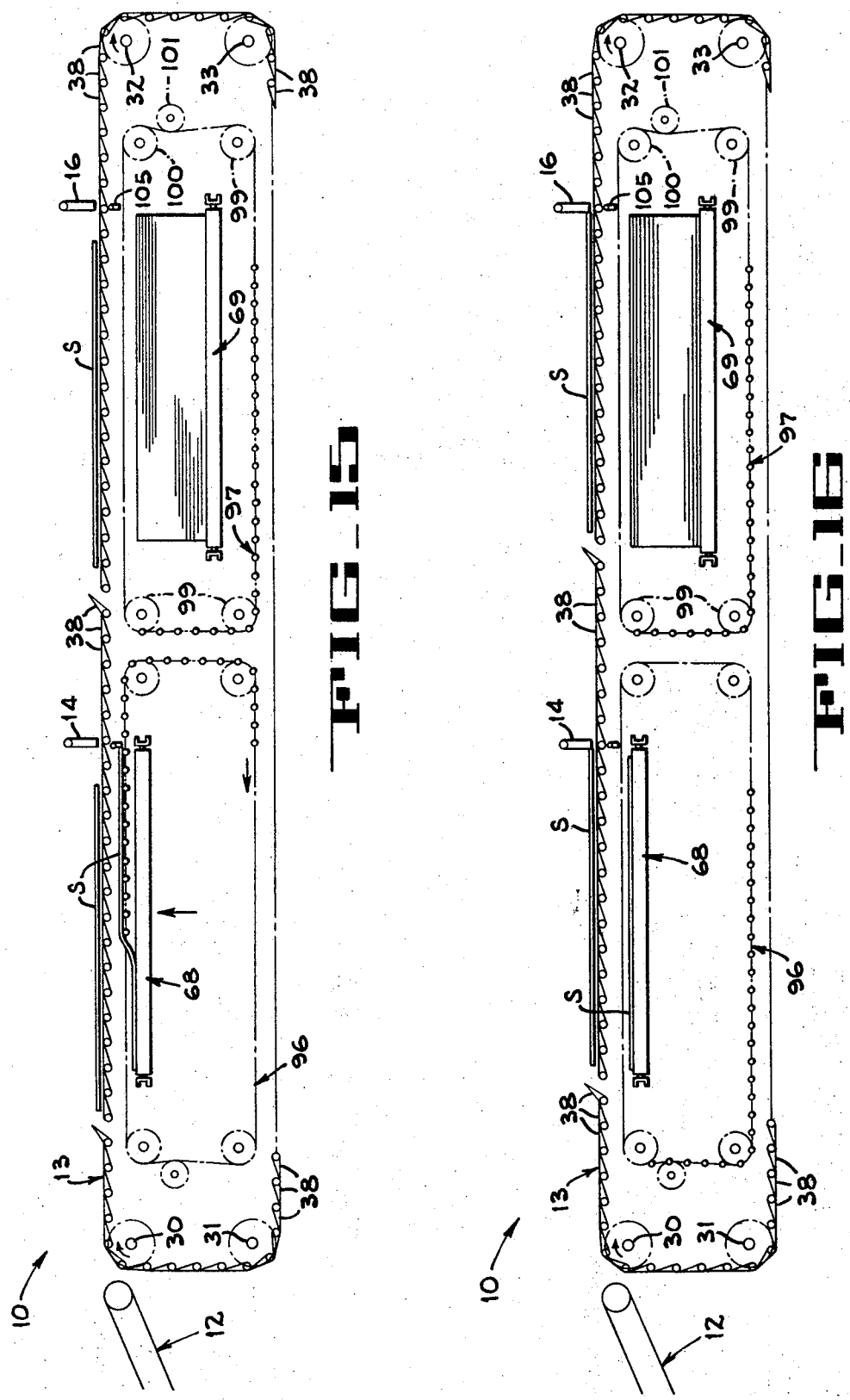

SHEET MATERIAL STACKING APPARATUS

BACKGROUND OF THE INVENTION

1. Field of the Invention

This invention relates to sheet material sorting and stacking apparatus and more particularly to apparatus for feeding, sorting and stacking sheets of material, such as veneer, according to size.

2. Description of the Prior Art

In a veneer mill, logs are continuously peeled to form a veneer ribbon 8 feet wide. This ribbon is cut transversely by a clipper into sheets at lengths of either 27 or 54 inches. These veneer sheets are classified according to type of wood, such as sapwood (wet) or heartwood (dry), and separated from scrap (any size of reject material) and random size (between 6 inch length and full sheet size). Usually, such sorting and stacking is performed by manual laborers who pull veneer sheets from a conveyor line and place the sheets in stacks adjacent thereto. Such an operation requires a large crew and a sizeable amount of floor space within the mill for the handling of the veneer. Frequently, there is a significant loss of veneer due to breakage of the thin sheets resulting from the manual handling because the sheets are gripped at the edges causing a large shear stress at the gripping points while the unsupported portion between gripping points bends excessively.

Another way of removing veneer sheets from a conveyor line is with a Swede box system whereby an operator manually pushes veneer sheets laterally of the conveyor into a gap between a pair of driven nip rolls which grab the veneer and drive it into a box. This system requires less labor than an operation using entirely manual labor but sheets are fequently damaged in handling and a certain amount of operator skill is required to obtain an even stack. When a stack must subsequently be handled by a fork lift vehicle, the sheet edges should be even because uneven protruding edges will be broken upon contact with the vertical supports of the fork lift mechanism.

An overhead vacuum conveyor system has been used to lift veneer sheets from a conveyor line and drop the sheets in appropriate stacks. However, it is difficult to keep sheet edges aligned even when stacks are formed in this manner because the sheets tend to glide to one side or another when falling from the vacuum head. Damage results when uneven sheet edges are engaged by a fork lift mechanism during subsequent handling.

SUMMARY OF THE INVENTION

The present invention provides apparatus for sorting and stacking sheet material automatically within a minimum amount of floor space and without excessive handling damage. By uniformly supporting the sheets during the transfer operations and minimizing unsupported lengths and by aligning sheet edges to provide even stacks, handling damage is reduced.

A horizontal conveyor having a series of flights for carrying sheet material thereon in a given direction of travel can selectively feed sheet material to underlying stacks as the conveyor is advanced. A sheet can be fed downwardly through an opening between adjacent flights that extend laterally of the conveyor direction of travel by positioning a gate above the conveyor to block the foward progression of the sheet thereon, while pivoting a flight behind the sheet to an inclined position. The inclined flight guides the sheet downwardly through an adjacent opening as the conveyor advances, and restraining means are provided to prevent the sheet from curling upwardly over either the gate or the inclined conveyor flight.

An elevator located under the conveyor and extending upstream from the gate supports a stack of sheets fed through the conveyor and moves vertically to maintain the top of the sheet stack at a constant elevation. An even stack is produced because one edge of each sheet contacts the gate and the opposite edge drops a uniform distance to the stack. Means are provided for ejecting full stacks from the elevator and means are also provided for accumulating sheets from the conveyor while full stacks are being ejected.

A transition conveyor, positioned upstream of the horizontal conveyor, can be used to space sheets sufficiently for raising flights or lowering gates between sheets on the horizontal conveyor. Scrap material can be discharged through the transition conveyor by elevating a portion thereof.

Controls are provided for sensing sheet size and operating flights and gates accordingly to stack regular size sheets, while allowing random sheets to pass over the stacks.

BRIEF DESCRIPTION OF THE DRAWINGS

FIG. 1 is a perspective view of sheet material sorting and stacking apparatus embodying the present invention.

FIGS. 2A and 2B, when taken together, constitute a side elevation view of the apparatus shown in FIG. 1, portions being broken away.

FIG. 3 is a perspective view of a portion of the horizontal conveyor particularly illustrating the roller chain and the attachment of the flights thereto.

FIG. 4 is a perspective view of a portion of the accumulator particularly illustrating the roller chain and the attachment of the lateral support members thereto.

FIG. 5 is an enlarged section taken on the line 5—5 of FIG. 1.

FIG. 6 is an enlarged perspective view of a portion of the horizontal conveyor as shown in FIG. 1 and particularly illustrating the location of the gates and holddown bars.

FIG. 6A is an isometric view of the camming means for setting the sheet deflecting means on the horizontal conveyor.

FIG. 7 is an enlarged diagrammatic view of the stack elevator together with its lift means and drive.

FIGS. 8-11 are electrical circuit diagrams for the sorting and stacking apparatus controls.

FIGS. 12-16 are operational views of the sorting and stacking apparatus.

DESCRIPTION OF THE PREFERRED EMBODIMENT

Figure 10:
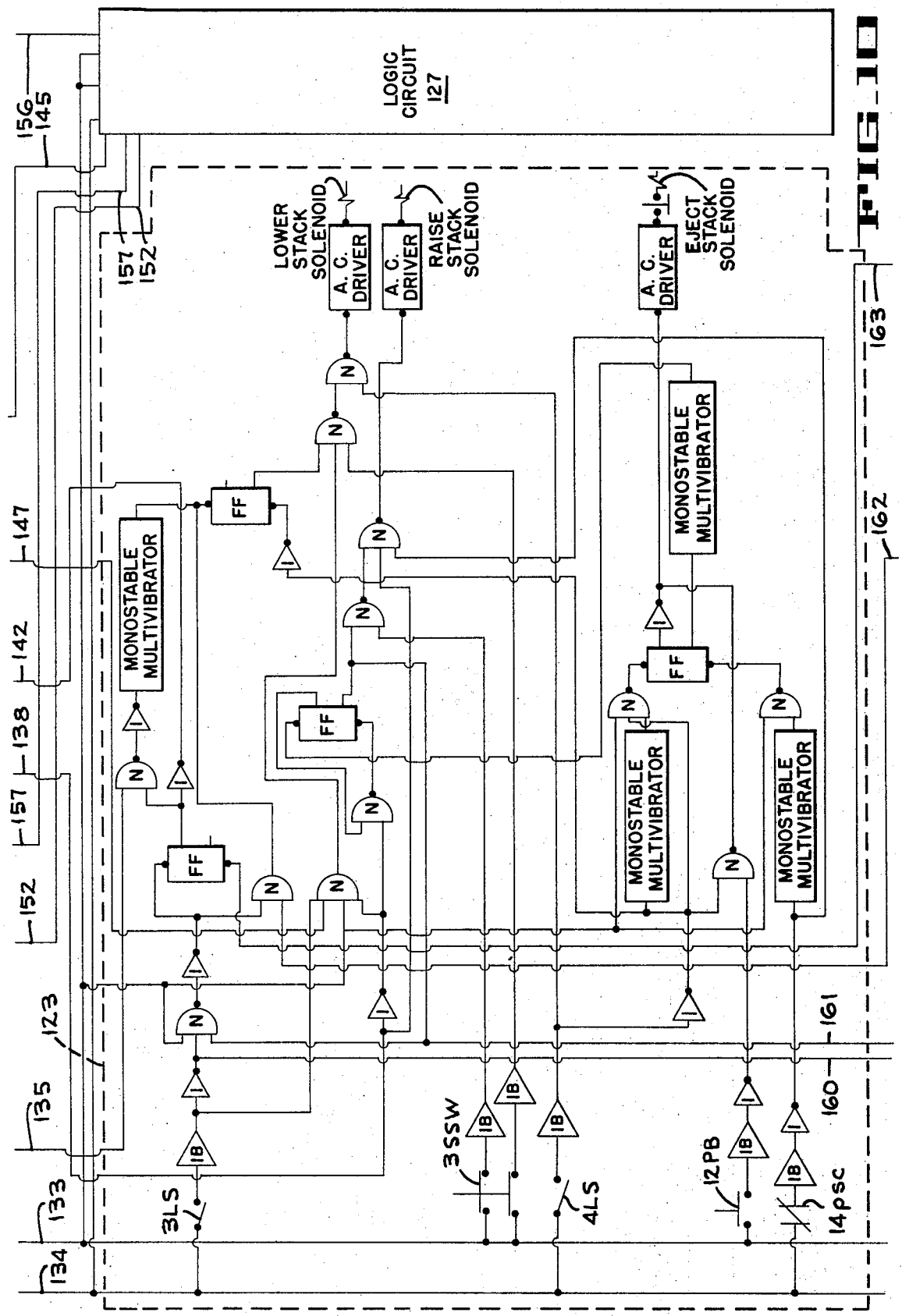

Looking now at FIG. 1, an apparatus 10 for sorting and stacking sheet material, such as veneer sheets, is located at the downstream end of a feed conveyor 11. A transition conveyor 12 receives sheet material from the feed conveyor, spaces the sheets and feeds the spaced sheets at a desired height and at a desired rate of speed to a main horizontal conveyor 13. Positioned above the horizontal conveyor is a first movable stop or gate 14 that controls the stacking of sheets in a bay 15 located under the horizontal conveyor. Similarly, a second movable stop or gate 16, located downstream from gate 14, controls the stacking of sheets in a bay 17 under the horizontal conveyor.

Standard size sheets S may be classified by the operator of the apparatus according to type of wood such as sapwood (wet) or heartwood (dry). Controls are provided so that the sapwood will be stacked in bay 15 while the heartwood is stacked in bay 17. Random sheets R will be carried over bays 15 and 17 and discharged from the end of the horizontal conveyor 13 into a pile P. While only two stacking bays are shown, it will be understood that any number of stacking bays can be used depending upon the degree of sorting required.

Transition conveyor 12, as shown in FIG. 2A, is supported by a frame 19 comprised of vertical, longitudinal and transverse supports. This conveyor includes a plurality of conveyor units spaced laterally across the width of the machine (FIG. 1) each unit including three distinct endless belts 20, 21 and 22 running at different rates of speed for progressively accelerating the sheets of material from the rate of speed at which they are fed by feed conveyor 11 to the rate of speed at which the horizontal conveyor 13 travels. The endless belts of the multiple conveyor units sufficiently support the sheet material carried thereon to prevent the bending or sagging thereof. All of the belts are trained about pulleys which are mounted upon transversely extending shafts (FIG. 2A) in a conventional manner.

Endless belts 20 adjacent feed conveyor 11 moves at a low speed equal to or slightly greater than the speed of the feed conveyor. These belts are supported in a cantilever manner and can be pivoted to an elevated position as indicated in phantom line in FIG. 2A, to allow scrap material to pass thereunder to a scrap removal conveyor 23. A covering 24 shields the lower run of the endless belts 20 from contact with the scrap material when the belts are elevated. Endless belts 20 are driven by a drive chain (not shown) coupling the non-swinging mounting shaft thereof with an adjacent sprocket wheel of feed conveyor 11.

Endless belts 21, located intermediately of transition conveyor 12, are driven at a speed higher than endless belts 20 by a suitable drive from a variable drive motor 27 mounted upon frame 19. Contact wheels 25 comprised of a series of laterally spaced tires inflated at low pressure are mounted above the endless belts 21 and run as idler units to hold the sheet material on the belts as it is moved. When a sheet of material passes over the endless belts 21, it passes under the contact wheels and is gripped between the wheels and belts to run at belt speed without skewing.

Endless belts 22, located adjacent horizontal conveyor 13, are driven faster than the belts 21 and at the same speed as the horizontal conveyor by a drive (not shown) interconnecting adjacent shafts 30 of the horizontal conveyor and shaft 28 which mounts the upper end of the belts 22. The length of endless belts 22 enable a regular size sheet of material to accelerate thereon to the speed of the horizontal conveyor after clearing contact wheels 25. The upper reach of endless belts 22 between pulley wheels is supported by a guide member 26 mounted upon the frame 19.

Transition conveyor 12 spaces sheets of material moving therealong to provide sufficient spacing for subsequent handling. Regular size sheets that are to be stacked require spacing in front and in back thereof in order that they can be dropped from the horizontal conveyor into the proper stack, but random size sheets do not require such spacing. Furthermore, the required spacing behind a regular size sheet is greater than the spacing required in front of the sheet, unless the sheet is preceded by another regular size sheet which requires an equal spacing in back thereof. Thus, the transition conveyor should properly space different size sheets alternately arranged in series, such as a small random size followed by a regular size sheet and another small random size sheet, so that spacing both in front and in back of the sheet is proportional to the sheet size.

The sum total of the spaces both in front and in back of a sheet caused by the sheet movement over transition conveyor 12 is equal to the product of the sheet dimension in the direction of conveyor travel times the ratio of the velocity increase between belts 20 and 22 to the velocity of belts 20. The velocity of belts 21 determines how the total spacing is distributed in front and in back of each sheet. If the velocity change of belts 21 from the velocity of belts 20 is one half the difference between the velocity of belts 20 and belts 22, there will be approximately equal spacing in front and in back of a sheet. If the velocity change of belts 21 from the velocity of belts 20 is greater than one half the velocity difference between belts 20 and 22, the spacing in back of the sheet will be greater than the spacing in front of the sheet. Thus, the desired spacing can be achieved by proportioning the velocity of belts 21 in relationship to the velocity difference between belts 20 and 22.

Main horizontal conveyor 13 is supported by a frame 29 comprised of vertical, longitudinal and transverse support members forming a structure of parallelepiped shape, as seen in FIG. 1. Shafts 30, 31, 32 and 33 are journalled within the frame at each of the corners thereof and extend transversely thereof. A pair of sprocket wheels 34 are mounted on each shaft, one sprocket wheel being adjacent one shaft end and the other sprocket wheel being adjacent the opposite shaft end. A double pitched roller chain 35 is trained about the four sprocket wheels on one side of frame 29, and a similar double pitched roller chain 35 is trained about the four sprocket wheels on the opposite side of the frame. Shaft 33 at the bottom of the downstream end of the frame is mounted in adjustable bearing blocks (FIG. 2B) for taking up the slack in roller chains 35.

With reference to FIG. 3, it will be seen that one roller chain 35 has pins 36 extending inwardly therefrom at spaced intervals and it will be understood that these pins are aligned to coincide with similar pins extending inwardly from the opposite roller chain. Tubular cross bars 37 extend transversely between the roller chains and are pivotally mounted on opposed pins. Forward facing supports 38 are welded to the cross bars at short lateral spacings to minimize bending stress in the sheet material carried thereon. The supports extend longitudinally of the conveyor so as to overlap the preceding cross bar. Each cross bar with its attached supports constitutes a flight, and to prevent supports from overlapping and interferring with each other, the supports are offset on every alternate cross bar. Thus, horizontal conveyor 13 is formed by two sets of similar flights alternately arranged.

At one end of each cross bar 37 is fixed an arm 39 (FIG. 3) having a cam roller 40 rotatably mounted thereon at the upper end of the arm and facing outwardly in the opposite direction from the cross bar. An ear 41 is rigidly coupled to each arm by a pin 42 that extends inwardly from the ear adjacent the cross bar. A second pin 43 is affixed to and projects inwardly from the upper end of the ear above the associated cross bar. Each flight is resiliently coupled to the following adjacent flight by a spring 44 that extends from the projecting end of pin 42 of one flight to the projecting end of pin 43 of the following flight, and these springs urge the pivotable cross bars into a rotated position where the supports 38 of each flight contact the cross bar 37 of the preceding flight, as shown in FIG. 3.

A horizontal track 46 projects inwardly from frame 29 and extends longitudinally thereof adjacent the path of cam rollers 40 along the upper run of horizontal conveyor 13. Each cam roller can be positioned to travel either above or below the track. When the cam rollers 40 travel above the upper surface of the track, supports 38 of the respective flight are in a closed horizontal position in contact with the preceding cross bar 37, but when a cam roller travels against the bottom of the track, its associated arm 39 holds cross bar 37 in a rearwardly pivoted position with the sheet material supports 38 of the respective flight raised to an upwardly inclined position in relationship to the preceding flight, thereby defining an opening between adjacent flights through which sheets can be fed. As shown, the lower portion of each support 38 includes an inclined portion 38a which serves to guide the sheet material to the underlying stack.

A cam 47, shown in FIGS. 1, 2A and 6A, is located at the upstream end of horizontal conveyor 13. With reference to FIG. 6A, cam 47 includes an arcuately curved camming surface 47a which is supported by a box frame structure including a pair of vertical flanges 47b that are pivotally mounted upon a pin 47c extending between mounting arms 47d and 47e at the top of the cam structure. A coupling pin 47f extends transversely between the vertical flanges at a location spaced below pin 47c, and a solenoid plunger 47g projecting from a solenoid 47h is connected to the coupling pin. Mounting members 47i and 47j fasten the solenoid within a housing 47k, and a tension spring 47s is interconnected between a pin 47m projecting inward within the housing and coupling pin 47f to hold the movable portion of the cam inwardly within the housing when the solenoid is de-energized. Upon energization of the solenoid, the movable portion of the cam is pivoted outwardly so that the camming surface 47a is projected into the path of one of the cam followers 40 (which energized position is illustrated in FIG. 6A) to deflect the cam follower downward below track 46, as indicated by the cam follower 40a shown in phantom-line in FIG. 6A. Upon de-energization of the cam, the movable portion of the cam is rapidly retracted into the housing by tension spring 47s to allow the subsequent cam followers to move above the track, as indicated by the cam follower 40b shown in phantom-line in FIG. 6A.

Looking again at FIG. 1, it will be noted that a plurality of angles 48 are mounted at the ends thereof by brackets 48a to frame 29 and extend transversely above horizontal conveyor 13 at spaced intervals therealong. Hold-down bars 49 having their upstream ends (50) inclined upwardly, extend longitudinally of the horizontal conveyor at locations spaced between supports 38. These hold-down bars are suspended from angles 48 by pivotal linkages 51 and 52, shown in detail clearly in FIG. 6. These linkages are coupled to the forward and trailing portions of a hold-down bar in a manner that enables the bar to swing upward from the conveyor while maintaining a parallel relationship thereto. Thus, it will be seen that the bars are urged by a uniform gravitational force into contact with a sheet S on the conveyor to restrain any portions of the sheet from curling or buckling upwardly.

Referring again to FIG. 1, gates 14 and 16 will be seen to be of similar construction but mounted at different locations along horizontal conveyor 13. Both gates extend transversely of the horizontal conveyor. Thus, only gate 16 will be described in detail and it will be understood that gate 14 is of similar construction. Gate 16, shown in detail in FIGS. 5 and 6, includes a tube 54 with depending stop plates 55 mounted thereon at positions spaced so as to avoid interference with the underlying supports 38 and holddown bars 49. A stub shaft 56 projects from each end of the tube, and each stub shaft is journalled in a bearing 57 fixed to a support 58 that is mounted on the upper side frame members of the frame 29.

As shown in FIGS. 5 and 6, each stop plate 55 is mounted to tube 54 by a bolt 59 and a bolt 60 that extend through the tube and stop plate. A sleeve 61 fits about the bolt 59, and the stop plate is mounted so as to be slidable upon this sleeve, but both the sleeve and the stop plate are locked on bolt 59 by a nut 62 on the outer end of the bolt. A compression spring 63 fits between the stop plate and a pair of washers coaxially mounted upon the projecting end of bolt 60 which washers are held in place by a nut 64 at the outer end of the bolt. Thus, each stop plate is resiliently mounted for deflection downsteam of the sheet conveyor after initial contact by a sheet in order to avoid sheet damage, but the strength of the springs 63 which yield under this deflection is sufficient to return the stop plate to a given position and thereby align the leading edge of the sheet at a uniform position following initial impact.

A crank arm 66 (FIGS. 1 and 5) is fixed to one end of each tube 54, and an actuating cylinder 67 is mounted between the crank arm and frame 29. Upon actuation of the cylinder, tube 54 can be rotated to a position where the assocated stop plates 55 are substantially vertically oriented to inhibit the forward progression of sheet material on horizontal conveyor 13 from a position where the stop plates are elevated above the conveyor for allowing sheet material to pass thereunder.

Looking now at FIG. 2A, a stack elevator 68 is mounted for vertical movement within bay 15 and a similar stack elevator 69, shown in FIG. 2B, is mounted for vertical movement within bay 17. These stack elevators are in their elevated positions in FIG. 1 and thus are not apparent therein. Elevator 69 will be described in detail and it will be understood that elevator 68 is similar in construction.

With reference to FIG. 7, it will be seen that elevator 69 comprises a U-shaped frame 70 supporting a series of idler rollers 71 and a series of driven rollers 72 spaced among said idler rollers which rollers in combination form a roller conveyor. The U-shaped frame includes four support arms 75 projecting outwardly therefrom to slidably fit in vertical channel guides 76 (FIG. 2B) that are attached to stanchions of frame 29. The driven rollers 72 are mounted upon shafts 73 which extend through frame 70 and have bevel gears 74 mounted at the outermost ends thereof.

A drive shaft 77 having bevel gears 78 mounted thereon is positioned adjacent the ends of shafts 73 so that bevel gears 78 can mesh with bevel gears 74. At one end of shaft 77 is a bevel gear 79 that meshes with a bevel gear 80 mounted on an output shaft 81 having universal joints therein for flexibility. The shaft 81 is driven by a motor 82. The output shaft 81, drive shaft 77, and driven rollers 72 are driven, as indicated by arrows in FIG. 7, when motor 82 is operated so that a stack of sheets on the rollers will be driven in the direction of arrow 83 and off of the elevator.

On each side of frame 70, a pair of roller chains 85 and 86 are attached to support arms 75 and are trained over sprocket wheels 87 and 88 mounted upon frame 29. Roller chains 85 and 86 are coupled by a connector 89 to a roller chain 90 on each side of frame 70, and each roller chain 90 is trained about a separate sprocket wheel 91 to make a perpendicular turn before being connected by a coupling 92 that is mounted at the end of an actuating rod 93 of power cylinder 94. Thus, it will be seen that frame 70 is elevated when the actuating rod 93 is retracted, and the frame is lowered when the actuating rod is extended.

Looking again at FIGS. 2A and 2B, an accumulator 96 fits within bay 15 and a similar accumulator 97 fits within bay 16. These accumulators enable continuous operation of the sorting and stacking apparatus 10 by catching sheets of material discharged through horizontal conveyor 13 when elevators 68 and 69 are lowered and are discharging a stack. The accumulators act to transfer the accumulated sheets to the elevators upon their return to sheet receiving positions. Only accumulator 97 shall be described in detail, and it will be understood that accumulator 96 is similar thereto in construction.

Accumulator 97 includes a pair of roller chains 98, one chain being adjacent one side of frame 29 and the other chain being adjacent the opposite side. Each roller chain 98 is trained about three sprocket wheels 99, one drive sprocket 100, and an adjustable idler sprocket 101 which latter sprocket engages the roller chain for adjusting slack therein. Drive sprocket 100 is driven from shaft 32 of horizontal conveyor 13 by a suitable drive, not shown, which includes a conventional clutch therein. Transverse tubes 102 are coupled between the pair of roller chains 98, and closely spaced saddles 103 (FIG. 4) are mounted upon the transverse tubes to provide a surface for supporting the sheets. Saddles 103 of adjacent tubes interdigitate to prevent a sheet edge from passing downward between the tubes. The support surface formed by the tubes and saddles extends only along a portion of the roller chains 98, and this surface can be moved across the upper end of bay 17 to catch sheets or it can be positioned at one side of the bay and thereunder, allowing sheets to pass between the roller chains and onto stack elevator 69.

A stop 105, shown in detail in FIG. 5, is positioned transversely above accumulator 97 to restrain the leading edges of the sheets when the accumulator support surface formed by tubes 102 and saddles 103 is moved from under the sheets (to the right as viewed in FIG. 2B), thus causing the sheets to drop onto elevator 69. It will be noted (FIG. 5) that the stop is mounted on a transverse beam 106 slidably fitted within frame 29. Coupled to one end of the transverse beam is an actuating rod 107 of a power cylinder 108 that is connected to an adjacent portion of the frame 29. A similar actuating rod and cylinder, not shown, are connected between the opposite end of the transverse beam 106 and the adjacent portion of the frame 29. These actuators can move the transverse beam in the downstream direction to position the stop out of the path of fall of a sheet edge from the gate stop plates 55 to the stack of sheets on the elevator when the accumulator is not in use. When the accumulator is moved into a position to receive sheets, the actuators position stop 105 in a proper position to restrain sheet edges upon the accumulator and discharge sheets therefrom.

Control circuitry for operating the sorting and stacking apparatus 10 will not be described. Although more than one regular sheet size can be handled by the apparatus together with random (i.e., non-stackable) sizes, the disclosed circuitry utilizes a selector switch to set the circuitry for handling only one specific sheet size on a given sorting operation with all other sheets being considered random sizes and not being stacked. Thus, to simplify the circuitry description, a circuit for handling one regular sheet size will be described, and it will be understood that similar circuits can be combined with such circuit together with the requisite selector switch. Other circuitry could be provided for stacking different size sheets in the proper bays of a multi-bay machine at the same time.

The following abbreviations have been used to identify standard electronic components in the control circuitry diagrams shown in FIGS. 8–11.

IB = Input Buffer
I = Inverter
N = Nand Gate
FF = Flip-flop

A series of photocells 110, shown in FIGS. 1 and 8, sense sheets moving along the input end of horizontal conveyor 13, and, with this information, the control circuitry determines the sheet size, such as regular or random, and the sheet position on the horizontal conveyor. The photocells are positioned above the conveyor and are aligned transversely thereof with each photocell being uniformly spaced downstream from the centerline of shaft 30 at the inlet end of the conveyor. On the transverse line, two photocells are spaced 4 inches apart adjacent the path of one edge of a sheet traveling upon the conveyor, and two photocells are spaced 4 inches apart adjacent the path of the opposite edge of the sheet. The photocells can be of a type packaged with a light souce in what is known commercially as Retro-Reflective Units and suitable reflectors can be positioned under the conveyor 13 to reflect light from the light sources backward towards the photocells until a sheet on the conveyor blocks the light beams.

Photocells 110 are always sensing light or dark, but readings which enter the control circuitry logic as distinct bits of information are taken only at times synchronized with movement of horizontal conveyor 13 so that cross bars 37 are not then under the photocells. When any one photocell senses a sheet, a reading indicating the presence of a sheet enters the logic. This arrangement together with the transverse spacing of photocells permits detection of the leading and trailing edges of a sheet when skewed and of sheets having knot holes therein. Any section having a knot greater than 3 ½ inches in diameter will be clipped from the veneer ribbon and discarded as scrap so no sheet will have a knot hole large enough to be sensed by two adjacent photocells. Furthermore, logs from which veneer is peeled seldom have knots spaced less than 1 foot apart a longitudinal direction, so, with two photocells spaced 4 inches apart, one of the photocells should sense a sheet passing thereunder regardless of the knot holes therein.

A pulse generator 111, shown schematically in FIG. 8, is a rotary or shaft position type pulse generator and is arranged to rotate 120° for every 2⅔ inches of travel of the horizontal conveyor 13. If the conveyor flights are assumed to be spaced apart by 8 inches, then there will be three shift pulses for the passage of each flight past a predetermined point. Upon every such 120° rotation, a clock or timing pulse is generated and transmitted to a shift register 112 to shift serially therein readings from photocells 110. Also, the pulse generator is arranged to provide another set of pulses for each complete rotation which means that such pulses are equivalent in timing to 8 inches of travel of the conveyor 13. The four photocells are connected to the shift register so that when any one photocell senses dark upon a pulse, information indicating the presence of a sheet will be entered as a "1" in the first position of the shift register. If all photocells sense light upon the pulse, information indicating the absence of a sheet will be entered as a "0" in the shift register. Upon each 2⅔ inch timing pulse, the recorded information is shifted serially one position along the shift register and a new bit of information is entered into the first position thereof.

Assuming sheets having a dimension of 27 inches in the direction of conveyor travel are to be stacked, the first 10 bit storage positions of shift register 112 are sensed by a logic circuit 113. An indication of no sheet 0 at position 10, followed by nine consecutive bits indicating a sheet 1 signifies that the leading edge of a regular size sheet is at a position corresponding to bit position nine in the shift register. While nine consecutive bits 1 could indicate a sheet dimension from 17 ⅓ inches to 26 ⅔ inches depending upon sheet skew of up to 4 inches and end positions when sensed, it is assumed that the sheet is regular size with a dimension in the direction of conveyor travel of 27 inches.

Logic circuit 113, which encodes the size and type of sheets traveling along horizontal conveyor 13, includes a nand gate 114 that receives an inverted signal from bit position 10 of shift register 112 and a regular signal from bit position nine. Only when the leading edge of a sheet is at a position corresponding to bit position nine will both signals be 1 so nand gate 114 will have an output of 0. A nand gate 115 senses shift register bit positions one through eight. When all bit positions indicate 1, the sheet is considered to be regular size and nand gate 115 will have an output of 0. Should less than nine bit positions indicate 1, the sheet is considered to be a random size and nand gate 115 will have an output of 1.

Following a random sheet size determination, logic circuit 113 resets the eighth bit in shift register 112 to a 0 each time a 1 appears therein so the sheet is encoded 0000000010. Regular size sheets are further denoted as being either wet or dry through circuit 113 which is connected with a shift register 118 that receives input information indicating whether a sheet is wet or dry from a relay contact 116 controlled by an operator making such classification. Circuit 113 will make no change in the coding within shift register 112 for a regular size sheet classified as dry in shift register 118 so the coding remains 1111111110. Should the sheet be denoted as wet, circuit 113 will change the seventh bit in shift register 112 to a 0, coding the sheet as 1111110110.

After sensing a regular size sheet, a signal will be sent from circuit 113 to a cam logic circuit 119 which includes the cam solenoid 47h to set cam 47 for raising the first flight following the trailing edge of the sheet upon the next 8 inch shift pulse. Information bits 1 are added to the first bit position in shift register 112 by circuit 113 on each 2 ⅔ inch shift pulse until the flight is raised so that coding within shift register 112 indicates the position of the raised flight instead of the end of the sheet. Each time the cam solenoid is actuated to raise a flight, a pulse is transmitted from cam logic circuit 119 through a lead 130 to a logic circuit 124 (FIG. 11) for accumulator 96 to enable the accumulator to start moving into position if necessary.

A reset pulse is transmitted from circuit 113 through a lead 131 to a decode logic circuit 120 (FIG. 9) for gate 14. An 8 inch shift pulse is transmitted from pulse generator 111 through a lead 132 to a logic circuit 124 (FIG. 11) for accumulator 96, and power is supplied to the various circuits through wires 133 and 134.

As an encoded sheet travels along conveyor 13, coding bits move within shift register 112, and when the first code bit indicating the leading edge of a sheet reaches position 20 in shift register 112, it is sensed by decode logic circuit 120, shown in FIG. 9. If the coding indicates the sheet at that point is regular size and coded wet, a solenoid 129 will be energized by the decode logic circuit to move the actuating rod within cylinder 67 and lower gate 14, unless it is already in a lowered position, to divert the sheet to a wet stack thereunder. A pulse is sent from the decode logic circuit 120, through a lead 135, to a logic circuit 123 (FIG. 10) that controls lowering elevator 68. The code in the seventeenth bit of shift register 112 will be changed from 1 to 0 so the sheet coding changes from 1111110110 to 1111100110 indicating the sheet has been dropped. When sheets are coded random size or dry, the gate 14 will be elevated, unless it is already in a raised position, allowing sheets coded as random size or dry to continue moving along the conveyor. Circuit 120 (FIG. 9) is reset for reading the next sheet by an up-flight coding 0 at bit position 17 in shift register 112 preceded by 1's at bit positions 18, 19, 20, and 21.

When code in shift register 112 indicates an up-flight by 0 at positions 34 preceded by 1's at positions 35, 36, 37 and 38, a decode logic circuit 121 (FIG. 9) activates a photodetector logic circuit 122 for sensing the height of a stack of sheets on elevator 68 by photocells 136 and 137. Responsive to the sensing, a pulse is sent from circuit 122 through a lead 138 to a logic circuit 123 which controls solenoids regulating a power cylinder 94 for lowering or raising elevator 68. In like manner, photocells 139 and 140 in circuit 122 sense the height of a stack of sheets on accumulator 96 to determine if the accumulator is full and in such case, inhibit the dropping of additional sheets upon the accumulator by a control pulse sent from circuit 122 through a lead 141 to circuit 120. A pulse is transmitted from circuit 121 through a lead 146 to logic circuit 128 to enable accumulator 97 to start moving into position and a pulse is transmitted through a lead 147 to logic circuit 123 to enable the raising and lowering of stack elevator 68. A pulse can also be sent from circuit 123 through a lead 142 to circuit 122 where connection is made with lead 141 to inhibit sheet dropping responsive to operation of a stack height limit switch 3LS. When up-flight coding 0 reaches position 39 in shift register 112, decode logic circuit 121 transmits a pulse to deactivate photodetector logic circuit 122 to eliminate sensing of the stack height at a time when a sheet can be dropping onto the stack.

A decode logic circuit 125 for controlling gate 16 senses shift register 112 at bit positions 52, 53, 54, 55 and 56 to determine when coding representing a regular size dry sheet has a leading edge at bit position 55. Upon sensing such a sheet coding, a solenoid 144 will be energized by decode logic circuit 125 to actuate power cylinder 67 to lower gate 16, unless the gate is already in a lowered position and the sheet will be diverted to a stack of dry sheets on elevator 69. A pulse is sent from decode logic circuit 125 through a lead 145 to a logic circuit 127 that is similar to logic circuit 123 and which controls solenoids regulating the power cylinder 94 for raising and lowering elevator 69. A random size sheet coding detected by circuit 125 results in elevating gate 16 unless the gate is already in a raised position so random sheets can continue along conveyor 13. A sheet coding for wet and previously dropped sheets 1111100110 detected by circuit 125 will not result in an operation of gate 16. Circuit 125 is reset for reading the next sheet coding after an up-flight coding 0 reaches position 52 in shift register 112.

When code in shift register 112 indicates an up-flight coding 0 at bit position 69, a decode logic circuit 126 for stack bay 17 activates logic circuit 122 for sensing the height of a stack of sheets on elevator 69 by photocells 150 and 151. Responsive to the sensing, a pulse is sent from circuit 122 through a lead 152 to a logic circuit 127 which is similar to logic circuit 123 and controls raising or lowering elevator 69. In like manner, photocells 153 and 154 in circuit 122 sense the height of a stack of sheets on accumulator 97 to determine if the accumulator is full and in such case, inhibit the dropping of additional sheets upon the accumulator by a control pulse sent from circuit 122 through a lead 155 to circuit 125. A pulse is transmitted from circuit 126 through a lead 156 to logic circuit 127 to enable the raising and lowering of stack elevator 69. A pulse can also be sent from circuit 127 through a lead 157 to circuit 122 where connection is made with lead 155 to inhibit sheet dropping responsive to operation of a stack height limit switch in circuit 127. When up-flight coding 0 reaches bit position seventy-four in shift register 112, circuit 126 deactivates photodetector logic circuit 122 to prevent sensing of the stack height at a time when a sheet can be dropping onto the stack.

Circuit 123 (FIG. 10) includes a limit switch 4LS that is closed when elevator 68 is lowered to a position as to have a full stack of sheets thereon. Closing of the limit switch energizes the circuit to enable upon a sensing of the next up-flight signal an automatic lowering of elevator 68 to an unloading position and actuation of a solenoid controlling motor 82 to operate the drive for ejecting the stack from the elevator. A relay contact 14 psc controlled by a photocell aligned adjacent the outer edge of elevator 68 provides a pulse when the stack is clear of the elevator for stopping motor 82 and raising the elevator. Circuit 123 also includes a selector switch 3 SSW by which an operator can control the raising and lowering of elevator 68. A push button 12 PB is provided for operator control of motor 82.

A lead 160 connects circuit 123 with circuit 124 for transmitting a signal therebetween when limit switch 3LS is closed and a lead 161 connects the circuits for transmitting a signal to inhibit running accumulator 96 into position when elevator 68 is being raised. Likewise, a lead 162 connects circuit 124 with circuit 123 for transmitting a signal to lower elevator 68 to unload height when limit switch 6-LS is closed for running the accumulator into position and a lead 163 connects circuit 124 with circuit 123 for transmitting a signal therebetween when automatic raising of elevator 68 has been completed. Logic circuit 127 is similar to logic circuit 123, while logic circuit 128 is similar to logic circuit 124, and there are similar connects between circuits 127 and 128 as those indicated between circuits 123 and 124.

Operation of sheet material sorting and stacking apparatus 10 will be more clearly appreciated with reference to FIGS. 12–16. Regular size sheets S move from left to right on horizontal conveyor 13 as indicated by arrows in FIG. 14. Wet (sap) sheets are to be stacked upon elevator 68, while dry (heart) sheets are to be stacked upon elevator 69. It will be noted that the stack of wet sheets on elevator 68, shown in FIG. 12, is full, while the stack of dry sheets on elevator 69 is only partially full.

It will be assumed that a wet sheet was stacked between the dry sheet moving over elevator 69 and the wet sheet moving over elevator 68 to give a full stack signal so that accumulator 96 follows the next sheet over elevator 68. Gates 14 and 16 are lowered, as shown in FIG. 13, to retain the leading edges of the respective sheets S, while supports 38 of flights following the sheets are elevated to an inclined position. As horizontal conveyor 13 continues to move towards the right, the trailing edge of each sheet is fed downwardly through a respective opening preceding a raised flight support, as shown in FIG. 14. The wet sheet is stacked upon accumulator 96 while the full stack is ejected from elevator 68 and the dry sheet is stacked upon the dry stack on elevator 69.

After the full stack has been ejected from elevator 68, the elevator is raised to an elevation slightly below accumulator 96. The accumulator then moves in a clockwise direction and the right edge of sheets retained on the accumulator engage stop 105, as shown in FIG. 15. The sheets then fall onto elevator 68 as the accumulator moves out from under the sheets and continues to a standby position as shown in FIG. 16.

Although the best mode contemplated for carrying out the present invention has been herein shown and described, it will be apparent that modification and variation may be made without departing from what is regarded to be the subject matter of the invention.

What is claimed is:

1. Sheet material stacking apparatus comprising a substantially horizontal conveyor having a series of flights for carrying sheet material thereon in a given direction of travel along a line with each flight extending laterally of the line of travel in a position with an upper surface of the flight normally horizontal and being movable to an inclined position in relationship to the line of travel forming an opening between the inclined flight and an adjacent flight through which sheet material can be fed from a supported position on the horizontal conveyor to a location therebelow; each flight when in the inclined position having a portion extending below and above the level of sheet material carried on the conveyor and slanting rearwardly downward from its position above the level of sheet material in order to guide sheet material through the opening in front of the inclined flight; a stop located above the horizontal conveyor in a position blocking the forward progression of a sheet of material on the conveyor; and means for moving a flight located behind the sheet of material to the inclined position, whereby the sheet of material is engaged along its forward edge by the stop while the rear edge of the sheet of material strikes said portion of the inclined flight and is fed downwardly through the opening in front of the inclined flight as the conveyor advances.

2. Sheet material stacking apparatus as described in claim 1, wherein said stop is mounted for movement from said position blocking the forward progression of sheet material on the conveyor to a position allowing sheet material to pass thereon; and means for moving the stop between said sheet blocking position and said sheet passing position.

3. Sheet material stacking apparatus as described in claim 2, including a transition conveyor for spacing sheets of material at a distance sufficient for raising a flight or lowering the stop between sheets, said transition conveyor feeding the sheets of material so spaced to the conveyor.

4. Sheet material stacking apparatus as described in claim 10 wherein said transition conveyor includes a section that can be moved to a position for discharging scrap material from the conveyor.

5. Sheet material stacking apparatus as described in claim 1, including an elevator positioned under the series of flights extending upstream of the conveyor from the stop to receive sheet material fed between flights, and means for regulating the height of the elevator to maintain the top of a stack of sheet material thereon at a constant elevation so that each sheet added to the stack will drop uniformly with edges thereof being aligned with the edges of the stack.

6. Sheet material stacking apparatus as described in claim 1, including means for sensing the size of sheet material moving with the conveyor, and means for actuating said flight moving means to move a flight to an inclined position in response to sensing a sheet of material that is of a predetermined size.

7. Sheet material stacking apparatus as described in claim 6, including means for actuating said gate moving means to elevate the gate in response to sensing a sheet of material that is under a predetermined minimum size and to lower the gate in response to sensing a sheet of over said predetermined minimum size.

8. Sheet material stacking apparatus as described in claim 6, wherein said sheet size sensing means includes a series of photocells arranged in a line extending transversely of the conveyor, a pulse generator for generating a pulse in response to a given amount of movement of the horizontal conveyor, and a shift register, said pulse generator being synchronized with movement of the horizontal conveyor so that the photocell readings are allowed to enter into the shift register as distinct bits only when no conveyor flights are positioned in the line of sight of the photocells.

9. Sheet material stacking apparatus as described in claim 8, wherein said series of photocells include two photocells spaced a short distance apart near one side edge of the horizontal conveyor and two photocells spaced a short distance apart near the opposite side edge of the horizontal conveyor.

10. Sheet material stacking apparatus as described in claim 8, wherein said shift register records the size and position of each sheet of material passing over the horizontal conveyor.

11. Sheet material stacking apparatus as described in claim 1 wherein each of said horizontal conveyor flights has an arm at one end thereof and a cam follower mounted at one end of said arm, and said flight moving means include a cam for contacting the cam follower of a flight to be moved so as to cause the cam follower to move to a position in which the conveyor flight is open.

12. Sheet material stacking apparatus as described in claim 1, including a transition conveyor for receiving sheets of material of various lengths at a given rate of feed and spacing the sheets so fed sufficiently for subsequent handling on the horizontal conveyor, said transition conveyor including a portion having a horizontal velocity greater than said given rate of feed but less than the velocity of the horizontal conveyor, and a contact means positioned to hold sheets in contact with that portion of the transition conveyor having the described velocity for movement therewith, whereby total spacing both in front and in back of a sheet is proportional to the dimension of the sheet in the direction of conveyor travel.

13. Sheet material stacking apparatus as described in claim 1 including a plurality of bars extending longitudinally of the conveyor, said bars having upwardly inclined upstream ends for receiving sheet material thereunder, and said bars being pivotally mounted to swing upwardly from the conveyor in a downstream direction while maintaining a substantially parallel relationship with the conveyor for restraining sheet material passing thereunder from curling or buckling upward.

14. Sheet material stacking apparatus as described in claim 1 wherein each of said flights span the space along the line of travel between adjacent flights to form a continuous support surface.

15. Sheet material stacking apparatus as described in claim 1 wherein said flights are arranged in overlapping relationship with adjacent flights along the line of travel to form a continuous support surface.

16. Sheet material stacking apparatus as described in claim 1, wherein each of said conveyor flights includes a transverse cross bar and a plurality of supports spaced laterally of the cross bar and projecting longitudinally forward thereof in the direction of conveyor travel, and wherein said stop includes a plurality of spaced stop plates extending downwardly in the lateral spaces between said plurality of supports to a level below the upper surface of the supports in the normal horizontal position of said flight, said stop plates being laterally spaced to avoid interference with the supports when a flight is in said inclined position.

17. Sheet material stacking apparatus as described in claim 16, wherein said stop is mounted for movement from said position blocking the forward progression of sheet material on the conveyor to a position allowing sheet material to pass thereon, said apparatus further including a plurality of hold-down means extending longitudinally of the conveyor past the position of the stop at an elevation above the conveyor and allowing sheet material carried upon the conveyor to pass thereunder while being restrained from curling or buckling upward, said longitudinally extending hold-down means being spaced laterally of the conveyor in positions to avoid interference with the supports on the flights and with the stop plates, whereby a sheet of material positioned below the longitudinally extending hold-down means, above the conveyor, in abutment with the stop and forward of an inclined flight is restrained while being fed downwardly through the opening in front of the inclined flight as the conveyor advances.

18. Sheet material stacking apparatus as described in claim 17 wherein each of said longitudinally extending hold-down means includes a plurality of longitudinally overlapping bars.

19. Sheet material stacking apparatus comprising an endless conveyor having a plurality of uniformly spaced flights mounted for movement thereon, said conveyor having a substantially horizontal run, means for feeding sheet material on said conveyor so that it is moved along said horizontal run, a gate mounted above said horizontal run and positioned so as to abut the leading edge of a sheet on said conveyor and restrain it from movement with the conveyor, means at the upstream end of said horizontal run of the conveyor for sensing the length of a sheet of material on the conveyor, and means operative with said sensing means for moving a selected flight behind the trailing edge of a sheet on said conveyor whereby said sheet will be ejected downwardly through said conveyor when the leading edge of said sheet strikes said gate and deposited onto a stack located beneath said horizontal run of the conveyor.

20. Sheet material stacking apparatus according to claim 19 including means for feeding said sheet material towards the horizontal run of said conveyor at a first speed less than the linear speed of the conveyor, a transition conveyor positioned between said feeding means and said conveyor; said transition conveyor being operable to move said sheet material at a speed intermediate of said feeding means speed and said conveyor speed, and hold down means for maintaining said sheet material on said transition conveyor and causing the sheet material to move at said intermediate speed when it is in engagement with said transition conveyor.

21. Sheet material stacking apparatus according to claim 21 wherein each conveyor flight includes a plurality of supports spaced laterally of the conveyor and extending forwardly in the direction of movement of the conveyor to overlap the preceding flight.

22. Sheet material sorting and stacking apparatus comprising a conveyor having a series of flights for carrying sheet material thereon in a given direction along a line of travel with each flight extending laterally of the line of travel, a gate mounted above the conveyor for movement between a position allowing sheet material to pass on the conveyor and a position blocking the forward progression of sheet material on the conveyor, means for directing a trailing edge of a sheet of material to feed downwardly through an opening between flights as the conveyor advances when a leading edge of the sheet material is engaged by the gate, sheet sensing means located upstream of the conveyor from the gate for sensing one of the transversely extending edges of sheet material carried thereon, control means responsive to the sensing of a sheet edge by the sheet sensing means for coordinating gate movement to a desired position with advancement of the leading edge of each sheet of material to the gate, and further control means responsive to the sensing of a sheet trailing edge by the sheet sensing means for coordinating operation of said trailing edge directing means with the location of the trailing edge of the sheet of material on the conveyor.

* * * * *

UNITED STATES PATENT OFFICE
CERTIFICATE OF CORRECTION

PATENT NO. : 3,807,553
DATED : April 30, 1974
INVENTOR(S) : RONALD J. BILLETT, GARY O. NIEMANN It is certified that error appears in the above-identified patent and that said Letters Patent are hereby corrected as shown below:

Column 13, line 38, "10" should be --3--.

Column 16, line 14, "21" should be --19--.

Signed and Sealed this twenty-sixth Day of August 1975

[SEAL]

Attest:

RUTH C. MASON
Attesting Officer

C. MARSHALL DANN
Commissioner of Patents and Trademarks